United States Patent
Sista

(10) Patent No.: US 11,003,663 B2
(45) Date of Patent: May 11, 2021

(54) CONFIGURATION-AWARE MICRO-DATABASE CACHES

(71) Applicant: PAYPAL, INC., San Jose, CA (US)

(72) Inventor: Shanmukh Sista, Milpitas, CA (US)

(73) Assignee: PayPal, Inc., San Jose, CA (US)

( * ) Notice: Subject to any disclaimer, the term of this patent is extended or adjusted under 35 U.S.C. 154(b) by 601 days.

(21) Appl. No.: 15/729,600

(22) Filed: Oct. 10, 2017

(65) Prior Publication Data

US 2019/0108229 A1    Apr. 11, 2019

(51) Int. Cl.
| | |
|---|---|
| *G06F 16/2455* | (2019.01) |
| *G06F 16/22* | (2019.01) |
| *H04L 29/08* | (2006.01) |
| *H04L 29/06* | (2006.01) |

(52) U.S. Cl.
CPC .... *G06F 16/24552* (2019.01); *G06F 16/2282* (2019.01); *H04L 65/1063* (2013.01); *H04L 67/1097* (2013.01); *H04L 67/2842* (2013.01); *H04L 67/32* (2013.01)

(58) Field of Classification Search
None
See application file for complete search history.

(56) References Cited

U.S. PATENT DOCUMENTS

2014/0372956 A1* 12/2014 Bisca ............ G06F 16/93 715/848
2017/0063992 A1*  3/2017 Baek ............ H04L 67/1097

* cited by examiner

*Primary Examiner* — Thu N Nguyen
(74) *Attorney, Agent, or Firm* — Haynes and Boone LLP

(57) ABSTRACT

Methods and systems for using dispersed cached data stored in multiple database nodes for serving database access requests are described herein. Upon receiving a request for data from a requesting device, a first application server determines whether the requested data is stored in a local cache memory. If it is determined that the requested data is not stored in the local cache memory, without accessing a local, first database, the first application server determines that the requested data is stored in a cache memory of a second application server, wherein the second application server stores at least a portion of the data from a second database in its cache memory. The first application server retrieves the requested data from the cache memory of the second application server and provides the retrieved data to the requesting device.

20 Claims, 5 Drawing Sheets

CONFIGURATION-AWARE MICRO-DATABASE CACHES

BACKGROUND

The present specification generally relates to database systems, and more specifically to using dispersed cached data to improve database performance.

RELATED ART

As online activities and transactions become more prevalent, demands for constant and uninterrupted online services are increasing. As a result, enterprise database systems are expected to perform at a higher level than ever. For example, many enterprise database systems today are expected to serve hundreds of millions of requests each day. The reliance on constant and uninterrupted online services also means that unavailability of a database system, no matter how short the downtime, can be costly to a business. As an example, several seconds of downtime for a database system may translate to denying or failing to process thousands of requests from end users. Thus, enterprise database system developers are facing pressure to improve the availability performance of database systems.

Data caching has been widely used to improve the speed for serving database access requests. However, most caches are not able to refresh when the corresponding database is unavailable, and due to the limited amount of high-performance memory, a large portion of data from the database is not cached. Therefore, the benefits of data caching is not fully realized. Thus, there is a need for improved database systems and methods that provide improved availability and speed performance.

Figure 1:
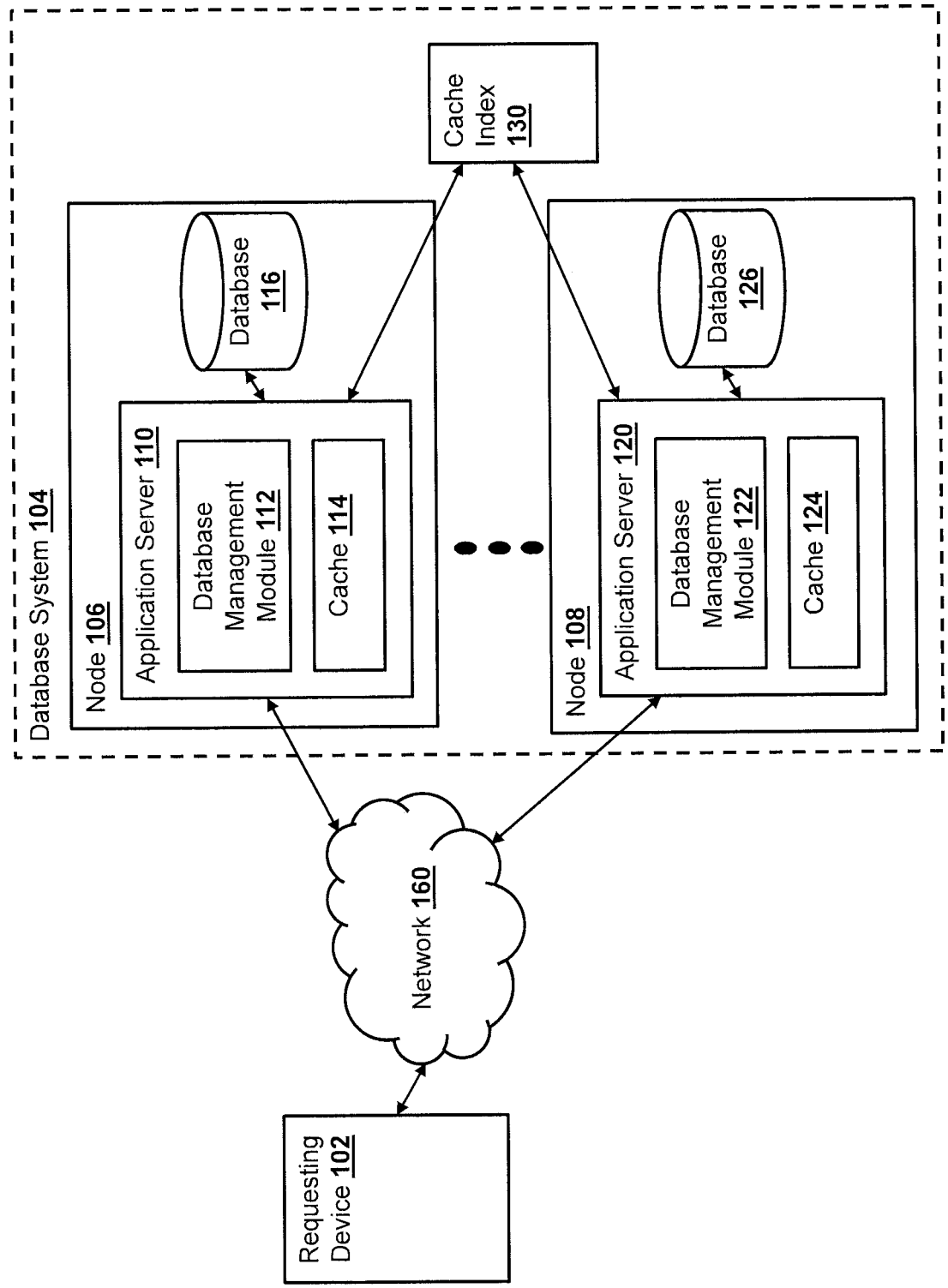
FIG. 1 is a block diagram illustrating a database system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for serving database access requests for a database system using dispersed cached data that is stored on different nodes associated with the database system. In some embodiments, the database system may include multiple nodes communicatively coupled with each other over a network. The nodes may be implemented within computer servers that are located in different geographical areas (e.g., in different cities across a country, in different countries, etc.) configured to serve database access requests from the corresponding geographical areas. Each node may include, or may have access to, a database storing data for the database system. In some embodiments, the databases at the nodes store a common set of data.

Each node in the database system may also include an application server that is communicatively coupled to the corresponding database of the node. In some embodiments, the application server interacts with external devices (e.g., end-users) and the database to serve database access requests. Each of the application servers may also include a cache memory for providing fast data retrieval such that the database access requests may be served more efficiently. For example, the application server may store a copy of the data that has just been requested in the cache memory such that in subsequent requests of the same data, the application server may retrieve the data from the cache memory instead of retrieving from the corresponding database. According to various embodiments of the disclosure, each application server may use data stored in its local cache memory and also data stored in cache memories of other application servers to serve database access requests. This way, the collective data stored in the cache memories of the application servers within the database system may act as a micro-database such that at least some of the database access requests may be served more efficiently and even when one or more databases are unavailable. When the number of nodes, and their corresponding application servers, is sufficiently large, the collective data may represent a large portion (or even the entirety) of the dataset stored in the databases. As a result, many or all of the database access requests may be served without accessing the databases themselves.

In some embodiments, the application server is a separate component from the corresponding database, such that the application server may still respond to database access requests from external devices when the corresponding database is unavailable (e.g., the connection with the database fails, the database is offline, etc.). According to various embodiments of the disclosure, upon receiving a request for data from a requesting device, the application server may initial determine whether the requested data is stored in the local cache memory of the application server. If it is determined that the requested data is stored in the local cache memory of the application server, the application server may retrieve the requested data from the local cache memory and may transmit the requested data to the requesting device. However, if it is determined that the requested data is not stored in the local cache memory, the application server may determine that the requested data is stored in a remote cache memory of another application server (e.g., of another node). The application server may then retrieve the requested data from the remote cache memory of the other application server via a network, and may transmit the requested data to the requesting device. Thus, the application according to various embodiments of the disclosure is capable of serving database access requests even when the corresponding database is unavailable, thereby improving performance of existing database systems.

FIG. 1 illustrates a database system 104 according to various embodiments of the disclosure. As shown, a database system 104 is communicatively coupled with external devices, such as a requesting device 102 via a network 160. The network 160, in one embodiment, may be implemented as a single network or a combination of multiple networks.

For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The database system 104 may include multiple nodes, such as a node 106 and a node 108. While only two nodes (nodes 106 and 108) are shown in this figure, it has been contemplated that the database system 104 of some embodiments may include as many (or as few) nodes as needed. As discussed above, the multiple nodes may be implemented within different physical machines (e.g., a computer server) that are located in different areas. In some embodiments, the different nodes may be located in different cities within a country, or in different countries, for serving database access requests initiated by devices located in the corresponding regions. In particular, each node may be configured to serve database access requests initiated from a predetermined geographical region (e.g., a city, a state, a country, etc.). Each node is also communicatively coupled with each other, and with other external devices, such as the requesting device 102, via the network 160. The requesting device 102 may be any type of computing device, such as a personal computer, a smart phone, or a tablet, being operated by a user. Although only one requesting device is shown in the figure, it has been contemplated that more requesting devices from different geographical regions may be used by end-users to transmit database access requests to the database system 104.

Through the requesting device 102, a user may perform an online activity (e.g., browsing the web, searching for an item, making an electronic transaction, etc.) over the network 160. The online activity may include transmitting a database access request to the database system 104 (e.g., accessing an item offered by an online merchant, etc.). Based on one or more factors (e.g., the geographical location of the requesting device 102), the database access request may be routed to one of the nodes 106 and 108 for servicing the request.

In some embodiments, each node includes a database and an application server. For example, the node 106 includes a database 116 and an application server 110, and the node 108 includes a database 126 and an application server 120. In some embodiments, each database is locally connected with the associated application server within the node. For example, the database 116 may be housed within the same physical server as the application server 110 or connected with a physical machine associated with the application server 110 within an internal network (e.g., local area network), and without going through an external network such as the Internet. In other embodiments, multiple nodes may access the same database. For example, the node 108 may not include the database 126, but instead, may access the database 116. In these embodiments, the database 116 may be located within the node 106 (locally connected to the application server 110) or may be located externally from both the nodes 106 and 108 but accessible by both of the application servers 110 and 120. It is noted that while the description below refers to an example where each node includes its own database, it has been contemplated that the techniques described herein may be operated in an environment where at least some of the application servers within the database system 104 access the same database.

Each of the databases 116 and 126 may store and maintain various types of information for use by the corresponding application servers 110 and 120, and may comprise or be implemented in one or more of various types of computer storage devices (e.g., servers, memory) and/or database structures (e.g., relational, object-oriented, hierarchical, dimensional, network) in accordance with the described embodiments. It is noted that each of the databases 116 and 126 may store data in a persistent/non-volatile data storage (e.g., a flash drive, a hard drive, etc.) such that the data stored in the databases 116 and 126 may persist over power cycles of the databases 116 and 126. In addition, each of the databases 116 and 126 may include a query engine configured to produce a result dataset based on a query (e.g., SQL query, etc.). In some embodiments, at least a portion of the data stored in each of the databases 116 and 126 are common with each other. For example, a dataset corresponding to the database system 104 may be replicated across the databases 116 and 126. Whenever there is an update to the data stored in one database, the corresponding data in the other database(s) may also be updated, for example, by implementing a periodic synchronization process across the databases. Furthermore, the databases 116 and 126 may be different types of databases. For example the database 116 may include a relational database management system (RDMS) while the database 126 may include an object-oriented database.

Each of the application servers 110 and 120 may be implemented as one or more stand-alone server machines. Exemplary servers may include, for example, enterprise-class servers operating a server operating system (OS) such as a MICROSOFT® OS, a UNIX® OS, a LINUX® OS, or another suitable server-based OS. It can be appreciated that the application servers illustrated in FIG. 1 may be deployed in other ways and that the operations performed and/or the services provided by such servers may be combined or separated for a given implementation and may be performed by a greater number or fewer number of servers.

Each of the application servers 110 and 120 includes a database management module and a cache memory. For example, the application server 110 includes a database management module 112 and a cache memory 114, and the application server 120 includes a database management module 122 and a cache memory 124. In some embodiments, each of the database management modules 112 and 122 may serve incoming database access requests (e.g., a read request or a write request) initiated by one or more requesting devices. Based on an incoming database access request, each of the database management modules 112 and 122 may generate a query, may run the query against the corresponding database (database 116 or database 126) to obtain a result dataset, and may transmit the result dataset back to the requesting device.

In addition, each of the database management modules 112 and 122 may cache at least some of the data from the corresponding database (database 116 or database 126) in the corresponding cache memory (the cache memory 114 or the cache memory 124). Each of the cache memories 114 and 124 includes temporary storage space or memory (persistent or non-persistent memory) (e.g., dynamic random-access memory (DRAM)) that provides fast access to data. It can be implemented by hardware or a combination of software and hardware. Typically, each of the cache memories 114 and 124 has smaller storage capacity than its corresponding database (the databases 116 and 126). As such, each of the database management modules 112 and 122 may only store a portion of the data from the corresponding database in the corresponding cache memory for fast retrieval. The database management modules 112 and 122 may use one or more cache policies for determining which data to store in the cache memories 114 and 124. Example cache policies may include a policy of caching most frequently accessed data, a policy of caching most recently accessed data, and the like, or a combination of any of the policies. It is noted that each of the database management modules 112 and 122 may implement its own cache policies independent of each other. As such, each of the application servers 110 and 120 may cache data according to its needs. For example, the application server 110 may cache data that is most frequently accessed at the application server 110, while the application server 120 may cache data that is most recently accessed at the application server 120. In other words, the application servers 110 and 120 do not coordinate with each other in caching data, which is different from typical implementations of distributed cache systems. For example, as will be discussed in more details below, each application server may store data in its cache memory according to its own cache policy, without sharing information about the cache policy with the other application servers in the database system 104. The cache policies for different application servers may even be different from each other. As such, each application server may store data in its own cache memory independent of what data may be stored in the cache memories of the other application servers. Without the coordination in caching, the database system 104 according to various embodiments of the disclosure advantageously removes the extra layer of complexity required by a typical distributed caching system.

Even though the caching of data at the different application servers is uncoordinated, it has been contemplated that different data may be cached at different application servers. In other words, the collective data that is cached at the different application servers is larger than the data that is cached at one application server. Given a sufficiently large number of nodes (and application servers) (e.g., 10, 50, 100, etc.), the collective data that is cached at the different application servers may comprise a large portion (or close to the entirety) of the dataset stored in each of the databases. It has been contemplated that the collective data that is cached at the different application servers may be used by the application servers as a micro-database for serving database access requests such that access to the databases may be reduced. In some embodiments, using this approach, database access requests may be served even when one or more local databases are unavailable.

According to various embodiments of the disclosure, when an application server (e.g., the application server 110) receives a database access request (e.g., a read request for a data from the database 116) from a requesting device (e.g., the requesting device 102), the application server may first determine whether the requested data is stored in a local cache memory (e.g., the cache memory 114). If the requested data is stored in a local cache memory, the application server may retrieve the requested data from the local cache memory and may transmit the requested data to the requesting device. If the requested data is not stored in the local cache memory, instead of querying the corresponding database (e.g., the database 116), the application server may determine which other application server (e.g., the application server 120) stores the requested data in its own cache memory. For example, the application server 110 may determine that the requested data is stored in the cache memory 124 of the application server 120. The application server 110 may then retrieve the requested data from the cache memory 124 (e.g., by sending a request for the requested data to the application server 120) via the network 160, and transmit the retrieved data to the requesting device.

The application server may use different mechanisms to determine which other application server stores the requested data in its cache memory. In one embodiment, the database system 104 may maintain a cache index, such as a cache index 130 that stores information indicating which application server(s) stores a particular data in its cache memory. Different embodiments may implement the cache index 130 in different ways. For example, the cache index 130 may be implemented as a hash table where dataset keys may be hashed to generate a value that corresponds to an identifier of an application server. The cache index may be implemented within a standalone server (either within any one of the nodes 106 and 108 or in a separate server) or may be implemented in a distributed manner across the application servers 110 and 120, for example, using a distributed data configuration management such as Zookeeper®. In some embodiments, each application server is responsible to update the portion of the cache index corresponding to data stored in its local cache memory.

Figure 2:
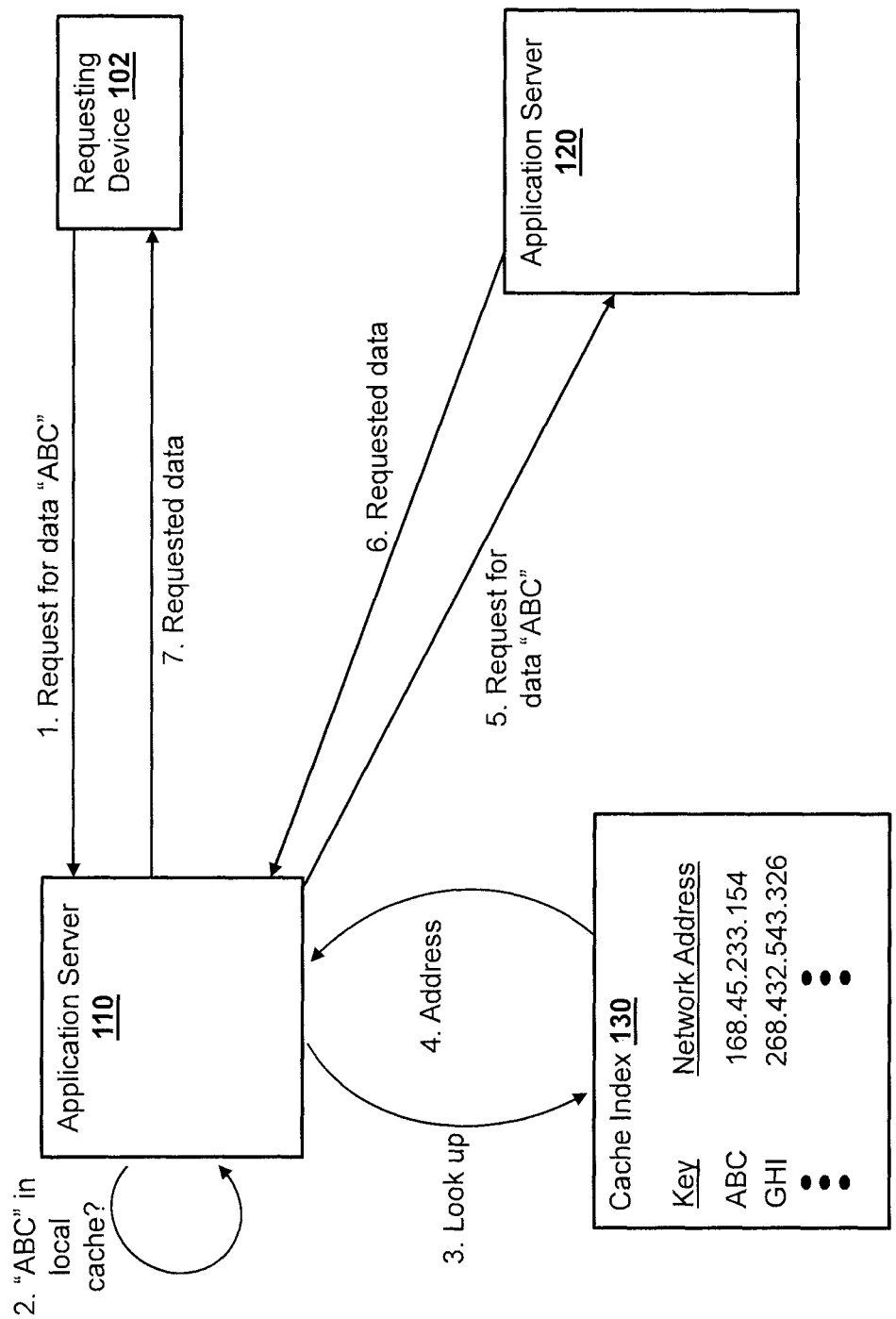
FIG. 2 illustrates servicing a database access requests according to an embodiment of the present disclosure.

FIG. 2 illustrates servicing a database access request by the database system 104 according to various embodiments of the disclosure. In this example, a request for data having a key 'ABC' is initiated by the requesting device 102 and transmitted to the application server 110. As discussed above, each of the application servers within the database system 104 may be configured to service requests from a corresponding geographical region. As such, the request for data may be transmitted to (or routed to by the database system 104) the application server 110, among all of the application servers of the database system 104, based on the geographical location of the requesting device 102. The request for data may also come in different forms. For example, the request for data may come in the form of a universal resource locator (URL) request. In such an example, the user of the requesting device 102 may type in the URL or selecting a link of an existing page (e.g., a webpage of the database system 104).

Upon receiving the request for data, the application server 110 (for example, the database management module 112 of the application server 110) may determine whether data value (the requested data) having a key 'ABC' is stored in the local cache memory (e.g., the cache memory 114). When it is determined that the requested data is not stored in the cache memory 114, the application server 110 may determine which (if any) other application server stores the requested data in its cache memory. In some embodiments, the application server 110 may make such a determination by looking up the cache index 130 based on the key 'ABC.'

FIG. 2 illustrates an example implementation of the cache index 130. As shown, the cache index 130 includes multiple entries of key and network address pairs. Each key is mapped to a network address corresponding to an application server of the database system 104 that has the data value corresponding to the key stored in its cache memory. In this example, the cache index 130 includes a first entry having a key 'ABC' with a corresponding network address of '168.45.233.154,' which corresponds to the application server 120. The cache index 130 also includes a second entry having a key 'GHI' with a corresponding network address of '268.432.543.326,' which may correspond to the application server 110. While only two entries are shown, more entries (or any number of entries) may be stored in the cache index 130 as needed.

As such, based on the key 'ABC,' the cache index 130 may return a network address (e.g., IP address 168.45.233.154) corresponding to an application server (e.g., the application server 120) that stores the requested data in its cache memory. Using the network address received from the cache index 130, the application server 110 may transmit a request for the data to the application server 120. In response to the request sent from the application server 110, the application server 120 may retrieve the requested data from the cache memory 124 and may transmit the requested data (e.g., the data value corresponding to the key 'ABC') to the application server 110. Upon receiving the requested data from the application server 120, the application server 110 may transmit the requested data to the requesting device 102.

In the example discussed above, the cache index 130 indicates that the data value corresponding to the key 'ABC' is stored only in the cache memory of one application server within the database system 104. Since the caching of the application servers are performed in an uncoordinated way, it has been contemplated that in some instances, the same piece of data (e.g., the data value corresponding to the key 'ABC') may be stored in cache memories of multiple application servers within the database system 104. For example, the cache index 130 may indicate that the requested data is stored in the cache memories of the application server 120 and a third application server that store the requested data in their cache memories. In this scenario, different embodiments of the application server 110 may use different approach to select one application server to use for retrieving the requested data. Under one approach, the application server 110 may determine a remote application server having the fastest response time, and retrieve the requested data from such a remote application server. The application server 110 may make such a determination by sending a request signal (e.g., a ping) to each of the application servers having the requested data in their cache memories, where the request signal requires the corresponding application server to respond with a response signal. The application server 110 may then determine which application server has a faster response time by comparing the speed in which the remote application servers respond to the request signals (e.g., the network speed). The network speed may be affected by the bandwidth between two application servers, the traffic between two application servers, or other network factors. Under another approach, the application server 110 may retrieve the requested data from a remote application server that has the most updated requested value. In this scenario, the index cache 130 may also include a time when the data was stored in the cache memory of the respective application server, in addition to the key and the network address. Thus, the application server 110 may determine a remote application server that stores the requested data in its cache memory most recently based on the time in the entries, and may then retrieve the requested data from such a remote application server.

Figure 3:
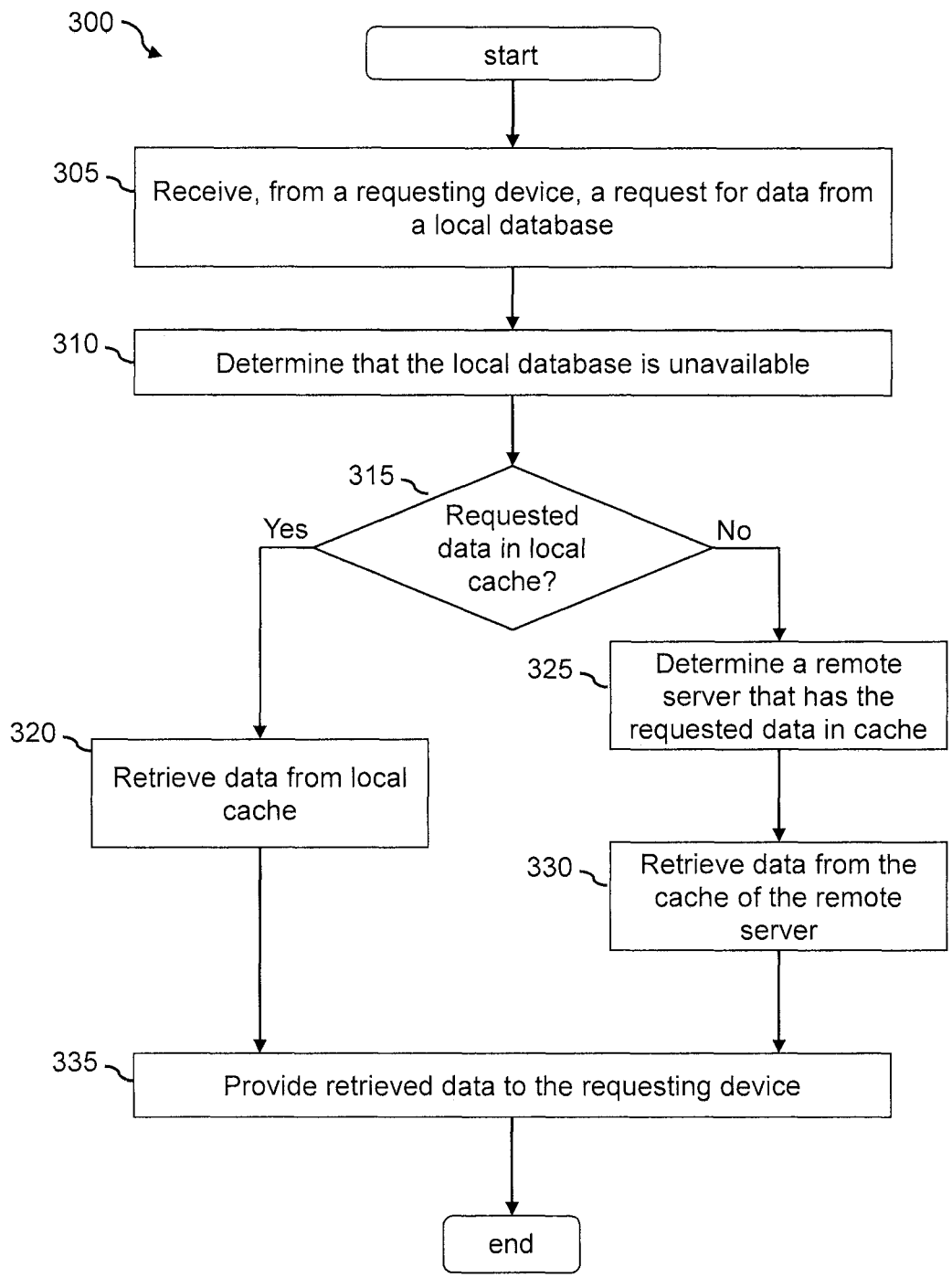
FIG. 3 is a flowchart showing a process of using dispersed cached data to service a database access request according to an embodiment of the present disclosure.

FIG. 3 illustrates a process 300 for using dispersed cached data stored in different application servers to service a request for data according to various embodiments of the disclosure. The process 300 may be performed by an application server (e.g., the application server 110 of the database system 140). The process 300 begins by receiving (at step 305) a request for data from a requesting device. For example, the request for data may be initiated by a requesting device (e.g., the requesting device 102) and transmitted to the database system 104. The request for data may be transmitted directly to an application server of the database system 104 (e.g., the application server 110) or may be routed to the application server based on one or more criteria (e.g., geographical location of the requesting device). As the application server 110 receives the request for data, the application server 110 may optionally determine (at step 310) that the local database is unavailable. The application server 110 may determine whether the database 116 is available or not by sending a request signal (e.g., a ping, a data access request, etc.) to the database 116 and detect a response signal from the database 116. If the application server 110 receives a normal or expected response from the database 116 in response to the request signal, the application server 110 may determine that the database 116 is available. However, if the request signal times out (no response after a predetermined duration) or if an error signal is received, the application server 110 may determine that the database 116 is unavailable. In some embodiments, the process 300 performs the following steps (e.g., steps 315-335) in response to the determination that the local database is unavailable. In these embodiments, when the local database is available, the process 300 may retrieve the requested data from the local database and may provide the requested data to the requesting device.

However, while the process 300 may be performed to advantageously service requests for data when a local database is unavailable as discussed above, it has been contemplated that the process 300 may be performed even when the local database is available such that the requested data may be retrieved from a local cache memory or a remote cache memory to efficiently service the requests. Thus, in some embodiments, the process 300 may not perform the determining step at step 310. The process 300 then determines (at step 315) whether the requested data is stored in a local cache memory (e.g., the cache memory 114 of the application server 110). If it is determined that the requested data is stored in the local cache memory, the process 300 retrieves (at step 320) the data value corresponding to the request for data from the local cache memory and provides (at step 335) the requested data to the requesting device.

On the other hand, in response to a determination that the requested data is not stored in the local cache memory, the process 300 determines (at step 325) a remote application server that has the requested data in its cache memory. For example, the application server 110 may use a key from the request for data to look up a network address corresponding to a remote application server from the cache index 130 in a manner discussed above by reference to FIG. 2. In the event that more than one remote application servers has the requested data stored in their cache memories, the application server 110 may use different ways to select one remote application for retrieving the requested data as discussed above by reference to FIG. 2. Once a network address of the remote application server is retrieved, the application server 110 may retrieve (at step 330) the data value corresponding to the request for data from the cache memory of the remote server (e.g., from the cache memory 124 of the application server 120), and may then provide (at step 335) the retrieved data to the requesting device.

Figure 4:
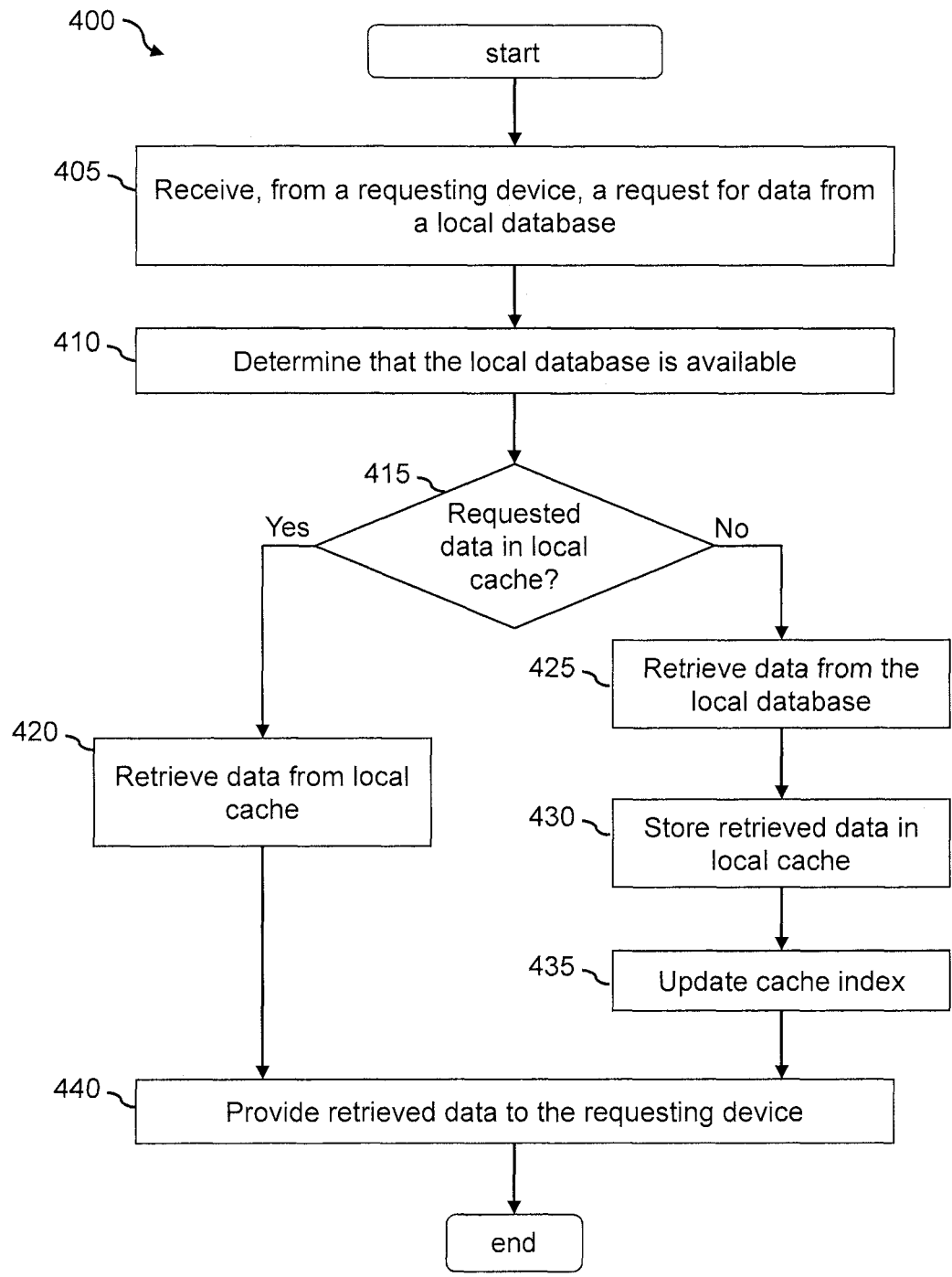
FIG. 4 is a flowchart showing a process of updating a cache index according to an embodiment of the present disclosure.

FIG. 4 illustrates a process 400 for updating a cache index according to various embodiments of the disclosure. The process 400 may be performed by an application server (e.g., the application server 110 of the database system 140). The process 400 begins by receiving (at step 405) a request for data from a requesting device. For example, the request for data may be initiated by a requesting device (e.g., the requesting device 102) and transmitted to the database system 104. The request for data may be transmitted directly to an application server of the database system 104 (e.g., the application server 110) or may be routed to the application server based on one or more criteria (e.g., geographical location of the requesting device). Upon receiving the request for data, the application server 110 determines (at step 410) that the local database is available. In some embodiments, if the application server 110 determines that the local database is unavailable, the application server 110 may switch to perform the process 300 instead.

The process 400 then determines (at step 415) whether the requested data is stored in a local cache memory (e.g., the cache memory 114 of the application server 110). If it is determined that the requested data is stored in the local cache memory, the process 400 retrieves (at step 420) the data value corresponding to the request for data from the local cache memory and provides (at step 440) the requested data to the requesting device.

On the other hand, if it is determined that the requested data is not stored in the local cache, the process 400 retrieves (at step 425) the data value corresponding to the request for data from the local database. For example, the application server 110 may generate a database query (e.g., SQL query) based on the request for data, and may run the query against the local database to obtain a result set comprising the requested data. Upon retrieving the requested data from the local database, the application server 110 may store (at step 430) the retrieved data in the local cache memory (e.g., in the cache memory 114) and may update (at step 435) the cache index (e.g., the cache index 130) to reflect that the data value corresponding to the request for data is now cached locally at the application server 110. For example, the application server 110 may insert a new entry in the cache index 130. The new entry may include a key corresponding to the requested data, a network address corresponding to the application server 110, and may also include a date and time when the data is stored in the cache memory. The application server 110 may also provide (at step 440) the retrieved data to the requesting device.

Figure 5:
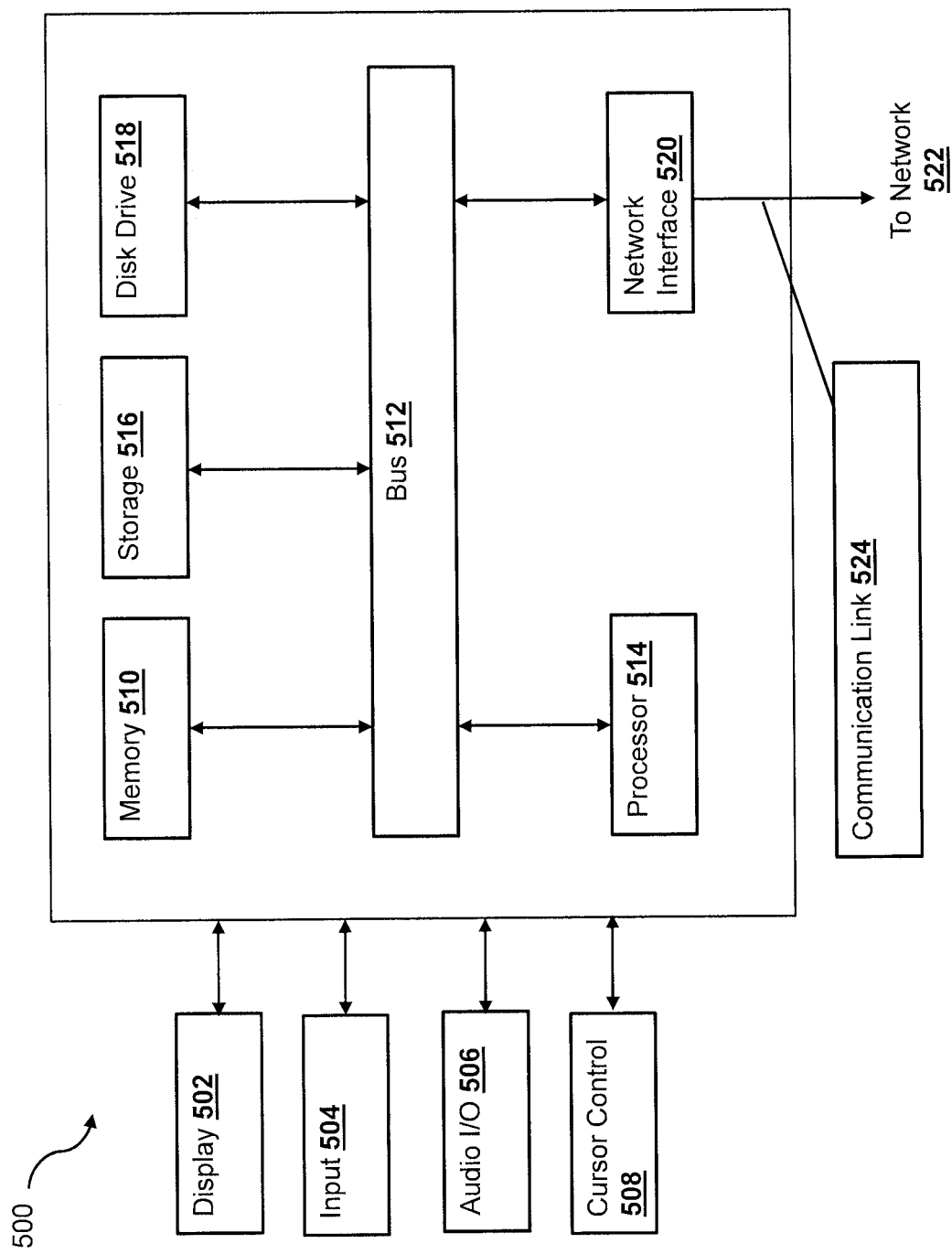
FIG. 5 is a block diagram of a system for implementing a device according to an embodiment of the present disclosure.

FIG. 5 is a block diagram of a computer system 500 suitable for implementing one or more embodiments of the present disclosure, including the application servers (e.g., the application servers 110 and 120) of the database system 104, and the requesting device 102. In various implementations, the requesting device 102 may include a mobile cellular phone, personal computer (PC), laptop, wearable computing device, etc. adapted for wireless communication, and each of the application servers 110 and 120 may include a network computing device, such as a server. Thus, it should be appreciated that the devices 110, 120, and 102 may be implemented as computer system 500 in a manner as follows.

Computer system 500 includes a bus 512 or other communication mechanism for communicating information data, signals, and information between various components of computer system 500. Components include an input/output (I/O) component 504 that processes a user (i.e., sender, recipient, service provider) action, such as selecting keys from a keypad/keyboard, selecting one or more buttons or links, etc., and sends a corresponding signal to bus 512. I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant associated with the database system 104. An optional audio input/output component 506 may also be included to allow a user to use voice for inputting information by converting audio signals. Audio I/O component 506 may allow the user to hear audio. A transceiver or network interface 520 transmits and receives signals between computer system 500 and other devices, such as another user device, a merchant server, or a service provider server via network 522. In one embodiment, the transmission is wireless, although other transmission mediums and methods may also be suitable. A processor 514, which can be a microcontroller, digital signal processor (DSP), or other processing component, processes these various signals, such as for display on computer system 500 or transmission to other devices via a communication link 524. Processor 514 may also control transmission of information, such as cookies or IP addresses, to other devices.

Components of computer system 500 also include a system memory component 510 (e.g., RAM), a static storage component 516 (e.g., ROM), and/or a disk drive 518 (e.g., a solid state drive, a hard drive). Computer system 500 performs specific operations by processor 514 and other components by executing one or more sequences of instructions contained in system memory component 510. For example, processor 514 can receive a request for data from a requesting device via a network, process the request for data according to the process 300 or the process 400, and transmit the requested data back to the requesting device via the network.

Logic may be encoded in a computer readable medium, which may refer to any medium that participates in providing instructions to processor 514 for execution. Such a medium may take many forms, including but not limited to, non-volatile media, volatile media, and transmission media. In various implementations, non-volatile media includes optical or magnetic disks, volatile media includes dynamic memory, such as system memory component 510, and transmission media includes coaxial cables, copper wire, and fiber optics, including wires that comprise bus 512. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A database system comprising:
   a non-transitory memory; and
   one or more hardware processors coupled with the non-transitory memory and configured to execute instructions from the non-transitory memory to cause the database system to perform operations comprising:
   receiving, by a first application server from a first device via a network, a first request for first data from a first database that is locally coupled to the first application server, wherein the first application server comprises a first cache memory;
   determining that the first data is stored in a second cache memory of a second application server, wherein the second application server is locally coupled to a second database;
   obtaining, via the network, the first data from the second application server for the first request based on the determining that the first data is stored in the second cache memory of the second application server;
   providing, via the network, the first data obtained from the second application server to the first device;
   receiving, by the first application server via the network from a second device, a second request for second data from the first database;
   in response to determining that the second data is not stored in the second cache memory, retrieving, by the first application server, the second data from the first database for the second request;
   storing, by the first application server, the second data retrieved from the first database in the first cache memory of the first application server; and
   updating, by the first application server, a cache index based on the second data stored in the first cache memory, wherein the cache index is accessible by the second application server.

2. The database system of claim 1, wherein the first data is determined to be stored in the second cache memory of the second application server based on the cache index.

3. The database system of claim 1, wherein the operations further comprise determining that the first data is not stored in the first cache memory, wherein the obtaining the first data from the second application server is responsive to the determining that the first data is not stored in the first cache memory.

4. The database system of claim 1, wherein the operations further comprise determining that the first database is unavailable, wherein the obtaining the first data from the second application server is responsive to the determining that the first database is unavailable.

5. The database system of claim 4, wherein the determining that the first database is unavailable comprises:
   transmitting a data access request to the first database; and
   receiving an error in response to the data access request.

6. The database system of claim 1, wherein the retrieving the second data from the first database is in response to determining that the second data is not stored in the first cache memory.

7. The database system of claim 1, wherein the operations further comprise:
   providing the retrieved second data to the second device via the network.

8. The database system of claim 1, wherein the updating the cache index comprises adding, to the cache index, a new entry comprising a key corresponding to the second data and a network address corresponding to the first application server.

9. The database system of claim 1, wherein the operations further comprise:
   receiving, by a third application server, a third request for the first data from a third database locally coupled to the third application server;
   determining that the first data is stored in the first cache memory of the first application server and the second cache memory of the second application server based on the cache index;
   selecting, by the third application server between the first and second application servers, a particular application server for processing the third request based on a set of selection criteria; and
   retrieving the first data from the particular application server for the third request.

10. The database system of claim 1, wherein each of the first database and the second database stores a common dataset, and wherein the first data is from the common dataset.

11. The database system of claim 1, wherein the first device is a user device, and wherein the first request for the first data is generated from a universal resource locator (URL) request.

12. A method, comprising:
   receiving, by a first application server of a database system from a first device via a network, a first request for first data from a first database that is locally coupled to the first application server, wherein the first application server comprises a first cache memory;
   in response to determining that the first data is not stored in the first cache memory or a second cache memory of a second application server, retrieving, by the first application server, the first data from the first database for the first request;
   storing, by the first application server, the first data retrieved from the first database in the first cache memory of the first application server;
   updating, by the first application server, a cache index based on the first data stored in the first cache memory;

receiving, by a second application server of the database system from a second device via the network, a second request for the first data from a second database that is locally coupled to the second application server;

determining, by the second application server, that the first data is stored in the first cache memory of the first application server based on the cache index;

retrieving, by the second application server, the first data from the first cache memory of the first application server for the second request;

storing, by the second application server, the first data in the second cache memory; and updating, by the second application server, the cache index based on the first data stored in the second cache memory.

13. The method of claim 12, further comprising:

receiving, by a third application server of the database system, a third request for the first data from a third database locally coupled to the third application server;

determining, by the third application server, that the first data is stored in the first cache memory and the second cache memory based on the cache index;

selecting, by the third application server, a particular application server between the first and second application servers for retrieving the first data based on a set of selection criteria, wherein the set of selection criteria comprises at least one of a network speed or a time of caching; and retrieving, by the third application server, the first data from the particular application server based on the selecting.

14. The method of claim 12, wherein the determining that the first data is not stored in the first cache memory of the first application server or the second cache memory of the second application server is based on the cache index.

15. The method of claim 12, further comprising determining, by the second application server, that the second database is unavailable, wherein the retrieving the first data from the first application server is in response to the determining that the second database is unavailable.

16. The method of claim 12, wherein the first application server stores the first data retrieved from the first database in the first cache memory of the first application server without coordinating with the second application server.

17. The method of claim 12, further comprising:

receiving, by the first application server, a fourth request for second data from the first database; and determining whether the second data is stored in the first cache memory of the first application server.

18. The method of claim 17, further comprising:

in response to determining that the second data is not stored in the first cache memory of the first application server, determining, by the first application server, whether the second data is stored in the second cache memory of the second application server based on the cache index;

in response to determining that the second data is stored in the second cache memory, retrieving, by the first application server, the second data from the second application server;

storing, by the first application server, the second data in the first cache memory of the first application server without coordinating with the second application server; and updating, by the first application server, the cache index based on the second data stored in the first cache memory.

19. The method of claim 12, wherein the updating the cache index based on the first data stored in the first cache memory comprises adding, to the cache index, an entry comprising a key corresponding to the first data, a network address corresponding to the first application server, and a time when the first data is stored in the first cache memory of the first application server.

20. A non-transitory machine-readable medium having stored thereon machine-readable instructions executable to cause a first application server of a database system to perform operations comprising:

receiving, from a first device via a network, a request for first data from a first database that is locally coupled to the first application server, wherein the first application server comprises a first cache memory;

determining that the first data is stored in a second cache memory of a second application server, wherein the second application server is locally coupled with a second database;

obtaining, via the network, the first data from the second application server first the first request based on the determining that the first data is stored in the second cache memory of the second application server;

receiving, via the network from a second device, a second request for second data from the first database;

in response to determining that the second data is not stored in the second cache memory, retrieving the second data from the first database for the second request;

storing the second data retrieved from the first database in the first cache memory of the first application server; and updating a cache index based on the second data stored in the first cache memory, wherein the cache index is accessible by the second application server.

* * * * *